United States Patent
Somers (10) Patent No.: US 11,742,674 B2
(45) Date of Patent: Aug. 29, 2023

(54) EFFICIENT MULTIPLE-BATTERY CHARGING FROM CONSTRAINED ENERGY SOURCE

(71) Applicant: Jonathan Matthew Somers, Ponte Vedra, FL (US)

(72) Inventor: Jonathan Matthew Somers, Ponte Vedra, FL (US)

(*) Notice: Subject to any disclaimer, the term of this patent is extended or adjusted under 35 U.S.C. 154(b) by 272 days.

(21) Appl. No.: 17/205,808

(22) Filed: Mar. 18, 2021

(65) Prior Publication Data

US 2021/0305819 A1 Sep. 30, 2021

Related U.S. Application Data

(60) Provisional application No. 63/001,821, filed on Mar. 30, 2020.

(51) Int. Cl.
 *H02J 7/00* (2006.01)
 *H02J 3/38* (2006.01)

(52) U.S. Cl.
 CPC ........... *H02J 7/00047* (2020.01); *H02J 3/38* (2013.01); *H02J 7/007* (2013.01); *H02J 7/0014* (2013.01); *H02J 7/0024* (2013.01); *H02J 2207/10* (2020.01); *H02J 2300/22* (2020.01)

(58) Field of Classification Search
 CPC .................................................. H02J 7/00047
 USPC ......................................................... 320/124
 See application file for complete search history.

(56) References Cited

U.S. PATENT DOCUMENTS

| | | | | |
|---|---|---|---|---|
| 10,461,531 | B2* | 10/2019 | Ellenberger | H02J 7/00032 |
| 2012/0074893 | A1* | 3/2012 | Cole | H02J 7/35 320/101 |
| 2014/0236883 | A1 | 8/2014 | Ye et al. | |
| 2017/0070049 | A1* | 3/2017 | Laubenstein | H02M 3/04 |
| 2017/0214246 | A1* | 7/2017 | Wang | H02J 7/0018 |

(Continued)

FOREIGN PATENT DOCUMENTS

| | | |
|---|---|---|
| CN | 203850903 U | 9/2014 |
| CN | 109038704 A | 12/2018 |
| WO | 2019126802 A1 | 6/2019 |

OTHER PUBLICATIONS

Akbar, N. et al., "Dynamic Model of Battery Charging," Proceedings of the Nov. 2015 IEEE Region 10 Conference TENCON, Published Jan. 1, 2015, Macao, China, 4 pages.

(Continued)

*Primary Examiner* — Jerry D Robbins
(74) *Attorney, Agent, or Firm* — Alleman Hall Creasman & Tuttle LLP (57) ABSTRACT

A multiple-battery charger includes a switching subsystem and a control element. The switching subsystem is configured to selectively electrically connect each of a plurality of individual batteries one at a time to a constrained energy source having electrical power production that varies over time. The control element is operatively connected to the switching subsystem. The control element is configured to deliver one or more pulse width modulated signals to the switching subsystem. The one or more pulse width modulated signals establish a duty cycle with which each of the plurality of batteries is electrically connected to the constrained energy source to receive electrical power from the constrained energy source.

22 Claims, 11 Drawing Sheets

(56) References Cited

U.S. PATENT DOCUMENTS

2018/0366712 A1    12/2018  Wyatt et al.
2021/0218251 A1*    7/2021  Chettiar .................. H02J 7/345

OTHER PUBLICATIONS

Bell, J., "Search Report," Global Patent Solutions LLC, dated Nov. 29, 2019, 10 pages.
Knoth, S., "Simple Battery Charger ICs for Any Chemistry," Analog Dialogue, vol. 53, No. 01, Jan. 2019, 4 pages.

* cited by examiner

EFFICIENT MULTIPLE-BATTERY CHARGING FROM CONSTRAINED ENERGY SOURCE

CROSS REFERENCE TO RELATED APPLICATIONS

This application claims priority to U.S. Provisional Patent Application Ser. No. 63/001,821, filed Mar. 30, 2020, the entirety of which is hereby incorporated herein by reference.

BACKGROUND

In many applications, multiple individual batteries may be used to provide electrical power to different electrical loads. In some examples, different batteries may serve different purposes, may have different capacities, different physical designs, and even different chemistries. Typically, different independent battery chargers are employed to manage the charging cycle of each different battery independently, for example when a relatively unlimited supply of electrical power, such as utility alternating current (AC) main power is available to charge the different batteries.

SUMMARY

A multiple-battery charger includes a switching subsystem and a control element. The switching subsystem is configured to selectively electrically connect each of a plurality of batteries one at a time to a constrained energy source having electrical power production that varies over time. The control element is operatively connected to the switching subsystem. The control element is configured to deliver one or more pulse width modulated signals to the switching subsystem. The one or more pulse width modulated signals establish a duty cycle with which each of the plurality of batteries is electrically connected to the constrained energy source to receive electrical power from the constrained energy source.

DETAILED DESCRIPTION

In vehicular and other applications, where multiple batteries serve different purposes (and may be of different capacities, different physical designs, and even different chemistries), battery chargers can manage the charging cycle of each battery independently, for example when a relatively unlimited supply of energy (such as utility alternating current (AC) main power) is available.

While the charging techniques for batteries can vary based on the chemical and physical makeup of the particular type of battery, a common attribute is that a battery cannot absorb energy infinitely fast. Most batteries have a maximum current acceptance limit (sometimes referred to as the "C rate"), beyond which degradation or even damage to the battery can occur. Likewise, most batteries have a maximum applied voltage limit, and exceeding this maximum voltage will result in degradation or damage. Depending on context, such charge states may be referred to as "bulk charge" and "absorption charge," or stated another way, such charge states may be referred to as the "constant current" and "constant voltage" phases of charging. Additional charge phases, such as a very-low-energy pre-charge phase and a maintenance or "trickle" charge phase (where the applied voltage is commonly maintained somewhere below the maximum allowable charge voltage) may also be recommended based on battery type.

Other conditions can also affect charging. The maximum allowable current and voltage of a battery may vary with temperature of the battery itself, and as a safety feature, charging may be disabled entirely if the battery temperature exceeds predetermined thresholds. Some battery types (such as lithium polymer batteries, which are sometimes encased in flexible packaging) may even exhibit mechanical changes, such as swelling if charge conditions are not correct. In some applications, these conditions can also be detected and compensated for through various mitigation operations.

Figure 1:
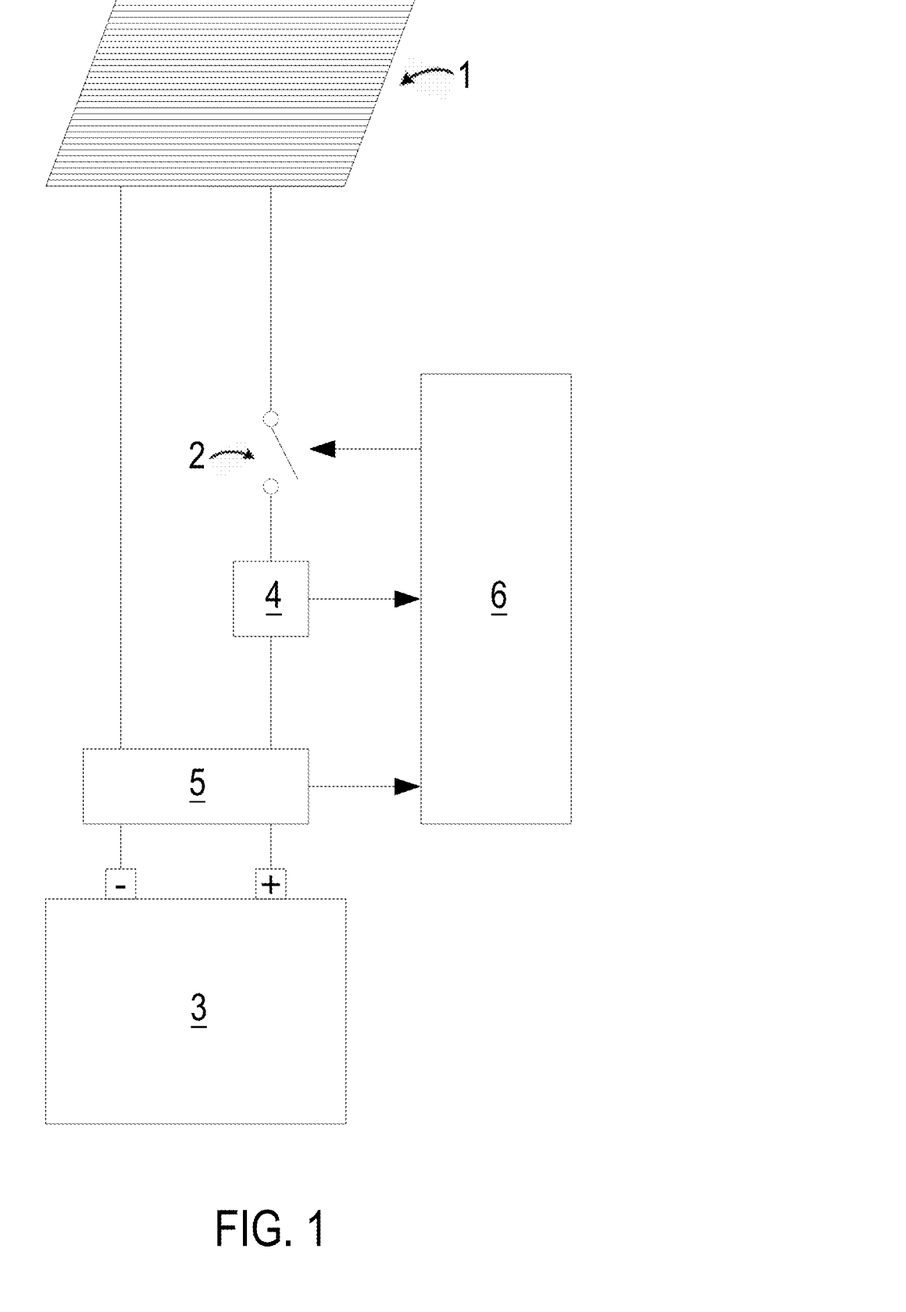
FIG. 1 shows an example battery charger.

In order for a battery charger to monitor voltage and current applied to a battery, the battery charger benefits from knowledge of the particular battery's charging voltage and current limitations. FIG. 1 shows an example battery charger. When energy is available from a source 1, such as a solar panel, a switch 2 is closed to allow energy to flow from the source 1 to a battery 3. A current sensor 4 and a voltage sensor 5 are electrically connected to the battery 3. A control element 6 monitors the output of the current sensor 4 and the voltage sensor 5 to prevent the current and voltage limits for the battery from being exceeded. If either limit is exceeded, then the control element 6 opens switch 2 to limit the flow of power to the battery. The exact composition of the elements in the battery charger can vary depending on the application. For example, the sensors may be simple analog transducers, or the sensors may be sophisticated analog-to-digital converters. Similarly, the control element may be an analog circuit, a digital circuit, or a microprocessor and associated firmware, depending upon the application. In some examples, the opening and closing of the switch 2 can happen very rapidly, with frequencies of thousands of switching cycles per second, as an example. Such switching may be recognized as a form of pulse width modulation (PWM). Correspondingly, in some examples, the power supply side of the battery charger may be a switch-mode power supply.

Many refinements to the battery charger illustrated in FIG. 1 are possible. For example, if the available voltage at the source is lower than the battery's voltage, then inductors and capacitors may be added to the battery charger to implement a voltage boost mode. Also, in some applications where the energy available at the source is greatly constrained and may vary with time, such as a solar-powered source where clouds pass in front of the sun, it may be desirable to use the switching mechanism in conjunction with additional components and algorithms to optimally match the power transfer rate from the source to the battery. Such a technique may be referred to as maximum power point tracking (MPPT). In some examples, a battery charger configured to optimally charge a single battery from a single source such as solar or wind may use MPPT techniques to optimize the harvesting of energy and the charging of the battery. However, this type of battery charger only charges a single battery, and the benefit of MPPT is lost as the battery approaches full charge and reaches either of the battery's constant voltage or constant current limits. Some applications use multiple sources such as two solar panels with two MPPT chargers and two batteries, however each system is completely isolated from the other. Such a battery charging approach is inefficient, because when one battery reaches full charge, the surplus power from the charging source of that battery is not available to assist in charging the other battery.

None of the above-described refinements affect a fundamental limitation that once the battery has entered either a current-limited phase or a voltage-limited phase of charging, some portion of the energy available at the source is unused and therefore wasted.

Accordingly, the present description is directed to an approach for providing optimal energy collection and distribution to simultaneously manage the charging cycle of multiple batteries even if the power source is limited and/or has varying energy production capabilities, such as a solar panel or wind turbine. The multiple-battery charging approach distributes available energy from one or more energy sources based on a variety of different charging factors. In some embodiments, switching between the different batteries may be performed repeatedly very rapidly (e.g., 100's-1000's time per second), such that energy may be appropriately distributed between the different batteries even as the amount of energy available from the energy source varies over time. The multiple-battery charging approach may enable the optimal power to be delivered independently to each battery and may allow different batteries with different functions, chemistries, and/or capacities to be charged at the same time.

Figure 2:
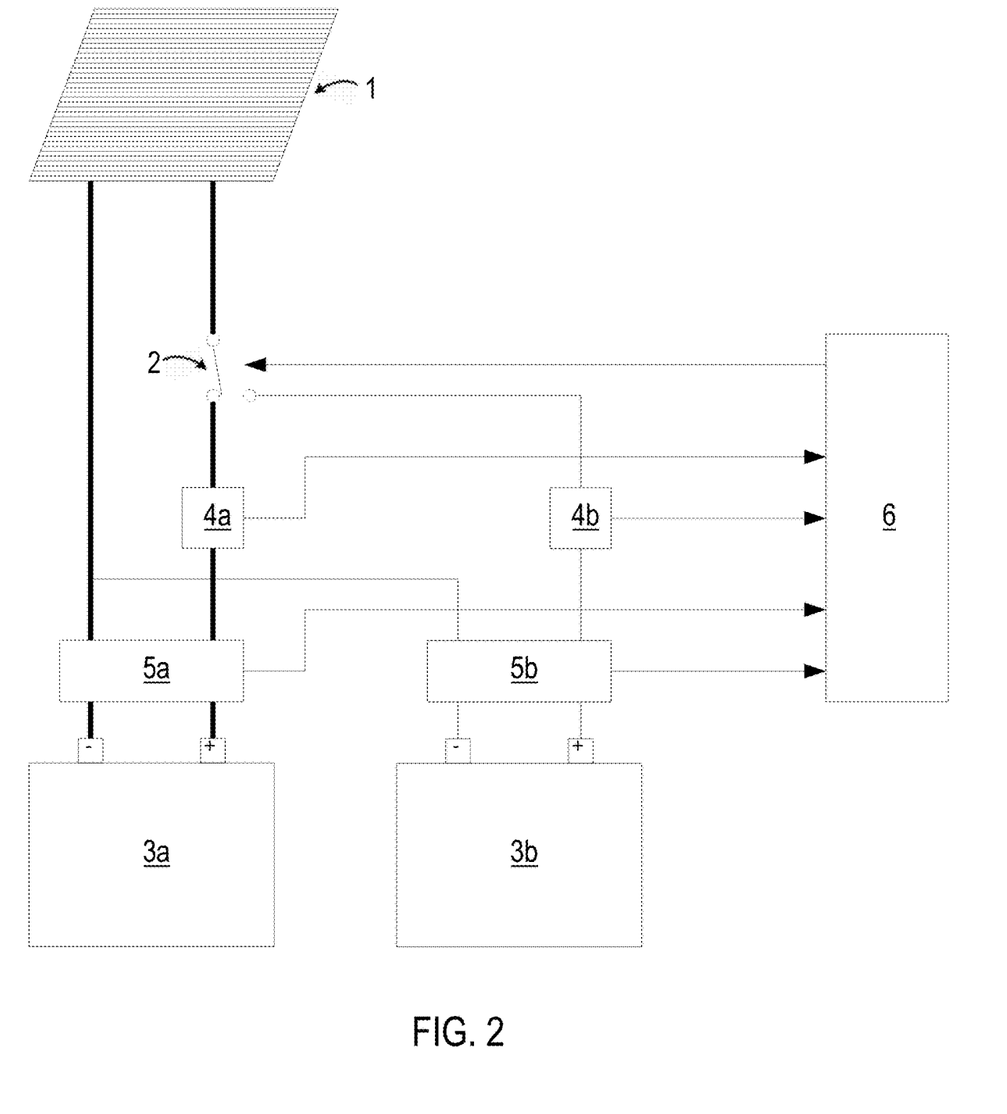
FIGS. 2 and 3 show an example multiple-battery charger configured to efficiently charge multiple batteries with power received from a constrained energy source.
Figure 3:
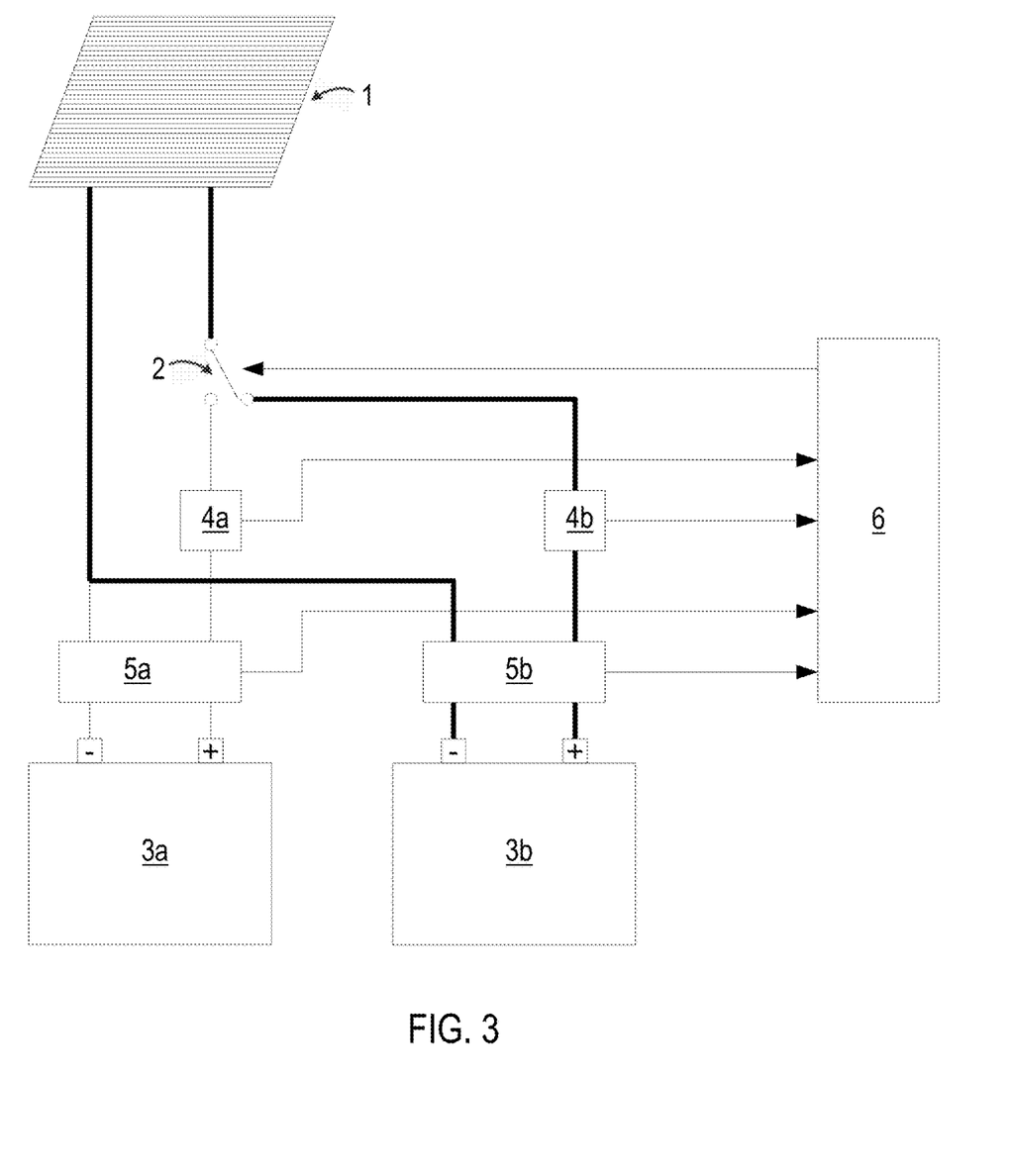

FIGS. 2 and 3 show an example multiple-battery charger configured to receive energy from a constrained energy source. An energy source 1 is selectively connected to either a first battery 3a or a second battery 3b via a switch 2 that is controlled by a control element 6. While two batteries are provided in this example, the switching mechanism and strategy described below may be extended to any number of batteries. There is no limitation on the number of batteries that may be cascaded in order to efficiently charge multiple batteries.

For example, the energy source 1 may include one or more solar panels and/or one or more wind turbines having constrained energy production capabilities that may vary over time. A first current sensor 4a is configured to send a current measurement of the first battery 3a to the control element 6. A first voltage sensor 5a is configured to send a voltage measurement of the first battery 3a to the control element 6. A second current sensor 4b is configured to send a current measurement of the second battery 3b to the control element 6. A second voltage sensor 5b is configured to send a voltage measurement of the second battery 3b to the control element 6.

The control element 6 is configured to control the switch 2 to switch between providing energy to the first battery 3a without providing energy to the second battery 3b as shown in FIG. 2 and providing energy to the second battery 3b without providing energy to the first battery 3a as shown in FIG. 3. The control element 6 is configured to send a PWM signal to the switch 2 to control operation of the switch 2. The PWM signal may dictate that the switch 2 repeatedly rapidly switches (e.g., 100's-1000's time per second) the electrical connection between a first state where the energy source 1 is electrically connected to the first battery 3a without being electrically connected to the second battery 3b and a second state where the energy source 1 is electrically connected to the second battery 3b without being electrically connected to the first battery 3a.

The control element 6 is configured to control a duty cycle of the PWM signal to distribute energy between the first and second batteries 3a and 3b.

The control element 6 may be configured to employ any suitable charging logic/strategy (i.e., switching decisions) for sharing charging capacity between the first and second batteries 3a and 3b. The control element 6 may be configured to adjust the charging duty cycle of each battery based on inputs from different sources (e.g., sensor signals from batteries 3a and 3b, load information from load monitors, and/or external information sources (e.g., weather forecast information)). Furthermore, the control element 6 may be programmed with control logic that defines a battery charging strategy specifying a changing distribution of electrical power from the constrained energy source 1 to the different batteries 3a, 3b such that the relative proportion of electrical power delivered from the constrained energy source 1 to the different batteries 3a, 3b changes over time. As an example, battery 3a may be deemed more important than battery 3b, and thus may be programmed to receive 100% of charging capacity until battery 3a is at least half full, then 90% of charging capacity until battery 3a is at least 75% full, then 50% of charging capacity until battery 3a is at least 95% full. The charging strategy may be designed to dynamically adjust the duty cycles of the different batteries based on inputs from any suitable sources. For example, if weather information inputs predict clouds, the charging strategy may dictate an adjustment of the PWM signal to charge higher priority batteries more aggressively.

The control element 6 may be programed to prioritize charging of one battery over another based on any suitable charging factors. For example, charging of one battery may be prioritized over another battery based on the different purposes for which the batteries are employed. As one non-limiting example, in a recreational vehicle or marine application, it is common for a first battery to be dedicated solely for engine starting, and for a second battery to be used for safety or convenience functions. Because the first battery is infrequently used, the battery will normally be close to full charge at all times. In this scenario, the multiple-battery charger affords considerable benefit, since the first battery will rapidly progress to the maintenance charge phase early in the day, allowing secondary and tertiary batteries to receive the bulk of available charging power at the earliest available opportunity. Other battery chargers that connect a power source to just one battery at a time instead of charging multiple batteries at the same time not only suffer from efficiency losses (power which could be harvested is lost during the current or voltage limiting phases of charging) but also require more aggregate time to achieve full charge on all batteries.

As another example, such charging factors may include predicted usage of the different batteries. For example, a battery that is predicted to be used before another battery may be prioritized over the other battery. Such predicted usage may be determined based on a prior history of use that is tracked and provided as input to the control element 6.

As yet another example, such charging factors may include predicted available power from an energy source. In one non-limiting example, if a solar panel provides lower power output in the early morning or late evening, batteries having charging attributes (e.g., lower voltage limits) that match that power may be prioritized during those periods over other batteries having different charging attributes that would charge less efficiently. The control element 6 may change the charging priority of different batteries as the predicted available power increases during the middle of the day to efficiently distribute the available power to the appropriate batteries.

The control element 6 may be configured to select and/or adjust a charging strategy based on any inputs. The control element 6 may be highly customizable to receive different inputs from different available sources for myriad different battery charging applications. The control element 6 may be configured to recognize the inputs that are available and select and/or adjust a charging strategy based on the available inputs. In some embodiments, the control element 6 may repeatedly reexamine which inputs are available based on various factors (e.g., based on a battery being connected to the multiple-battery charger, based on gaining network connectivity to receive information from a remote source (e.g., battery information service computer, weather information service computer, location information service computer), based on being turned on, based on a designated time of day or a duration). Further, the control element 6 may update the charging strategy based on the currently available inputs.

In one non-limiting example, the control element 6 is configured to adjust the duty cycle of the PWM signal based on inputs in the form of measurements of parameters (e.g., current and voltage) of the first and second batteries 3a and 3b. As one non-limiting example, the control element 6 controls the duty cycle of the PWM signal sent to the switch 2, such that the first battery 3a receives a higher percentage of the available power on a per duty cycle-basis and the second battery 3b receives a lower percentage of the available power on a per duty cycle-basis. In this case, the control element 6 adjusts a state of the switch 2 on a per duty cycle-basis to distribute power to each of the batteries each duty cycle. As one non-limiting example, the multiple-battery charger may operate in this manner until the first battery 3a reaches either a current-limited or voltage-limited charge region as detected by the control element 6 based on measurements of either the first current sensor 4a or the first voltage sensor 5a. Based on the first battery 3a reaching either the current-limited or voltage-limited charge region, the control element 6 adjusts the duty cycle of the PWM signal, such that the second battery 3b receives a higher percentage of the available power on a per duty cycle-basis and the first battery 3a receives a lower percentage of the available power on a per duty cycle-basis. For example, the first battery 3a may receive a significantly lower percentage of available power on a per duty cycle-basis such that the first battery 3a does not exceed either of the current or voltage limits.

In the above-described example, when first battery 3a is early in the charge cycle, the battery charger is in the state of operation shown in FIG. 3 for a small percentage of time relative to the state of operation shown in FIG. 2 on a per duty cycle-basis. Thus, a small portion of the energy source's surplus energy will be diverted to the second battery 3b. However, as the charge cycle progresses, the first battery 3a will approach a full charge capacity, and the vast majority of the energy available from the energy source 1 will then be used to charge the second battery 3b on a per duty cycle-basis. Once the current and voltage of the second battery 3b, return to acceptable levels, the control element 6 may further adjust the duty cycle of the PWM signal to provide an equal percentage of power to each of the first and second batteries while protecting the first and second batteries from overcurrent and overvoltage conditions.

As another non-limiting example, the control element 6 may control the duty cycle of the PWM signal sent to the switch 2, such that the first battery 3a receives 100% of the duty cycle until the first battery 3a reaches a first threshold charge (e.g., 70% full). Based on the first battery 3a reaching the first threshold charge, the control element 6 adjusts the duty cycle of the PWM signal to be 50%, such that the first and second batteries receive even charging. The control element 6 controls the switch 2 in this manner until the first battery 3a reaches a second threshold charge (e.g., 95% full). Based on the first battery 3a reaching the second threshold charge, the control element 6 adjusts the duty cycle of the PWM signal to provide a trickle charge (e.g., 5% duty cycle) to the first battery 3a and provide the remainder of the power (e.g., 95% duty cycle) to the second battery 3b.

In another non-limiting example, the control element 6 may control the duty cycle of the PWM signal to be split evenly between the first and second batteries such that the first and second batteries are charged evenly instead of prioritizing charging the first battery over the second battery. In yet another example, the control element 6 may control the duty cycle of the PWM signal to prioritize charging the second battery 3b over charging the first battery 3a. These different battery charging strategies are provided as non-limiting examples and numerous other battery charging strategies may be employed by the multiple-battery charger.

Figure 4:
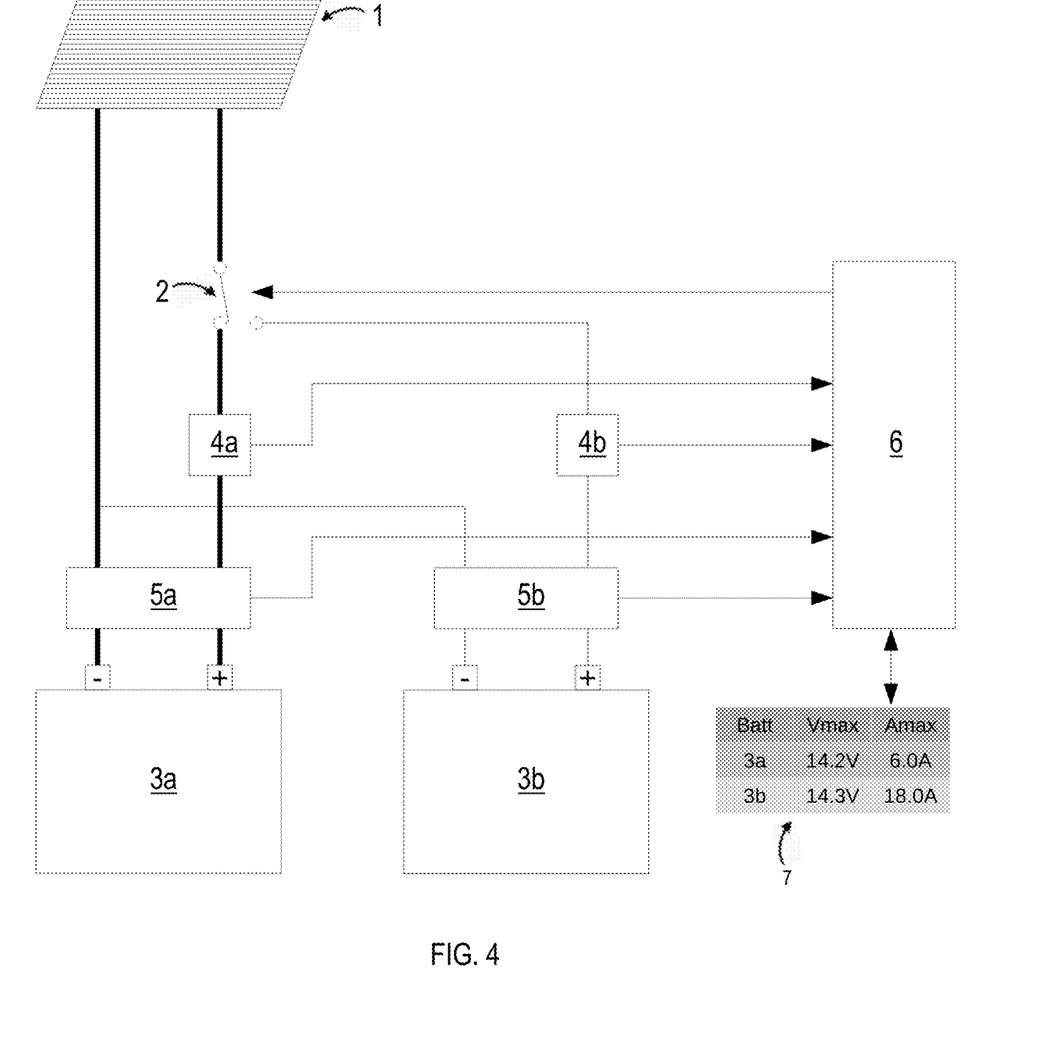
FIGS. 4 and 5 show different exemplary multiple-battery chargers configured to track charging attributes of different batteries independently.

In some embodiments, a multiple-battery charger may be configured to track voltage limits, current limits, and/or other charging attributes for each battery independently, and control power distribution based on such independent charging attributes of the different batteries. FIG. 4 shows an example multiple-battery charger configured to track charging attributes of different batteries independently. To enable such individual tracking of charging attributes, the control element 6 may embody a microprocessor, microcontroller, or a similar control component that includes memory to store a Table 7 that prescribes the voltage limits, current limits, and other charging attributes for each of the first battery 3a and the second battery 3b independently. The control element 6 may use the Table 7 and/or another suitable data structure to implement the charging logic/strategy for the different batteries. Such independent tracking capabilities allow the multiple-battery charger to charge batteries with different chemistries and capacities. For example, the multiple-battery charger is capable of charging different heterogenous batteries (e.g., a first battery that is a 70 amp-hour lead-acid starter battery and a second battery that is a 200 amp-hour absorbent glass mat (AGM) battery). In some examples, the charging attributes listed in Table 7 may be provided by a battery manufacturer. In other examples, the charging attributes listed in Table 7 may be programmed into the control element 6 by an end user of the multiple-battery charger.

Figure 5:
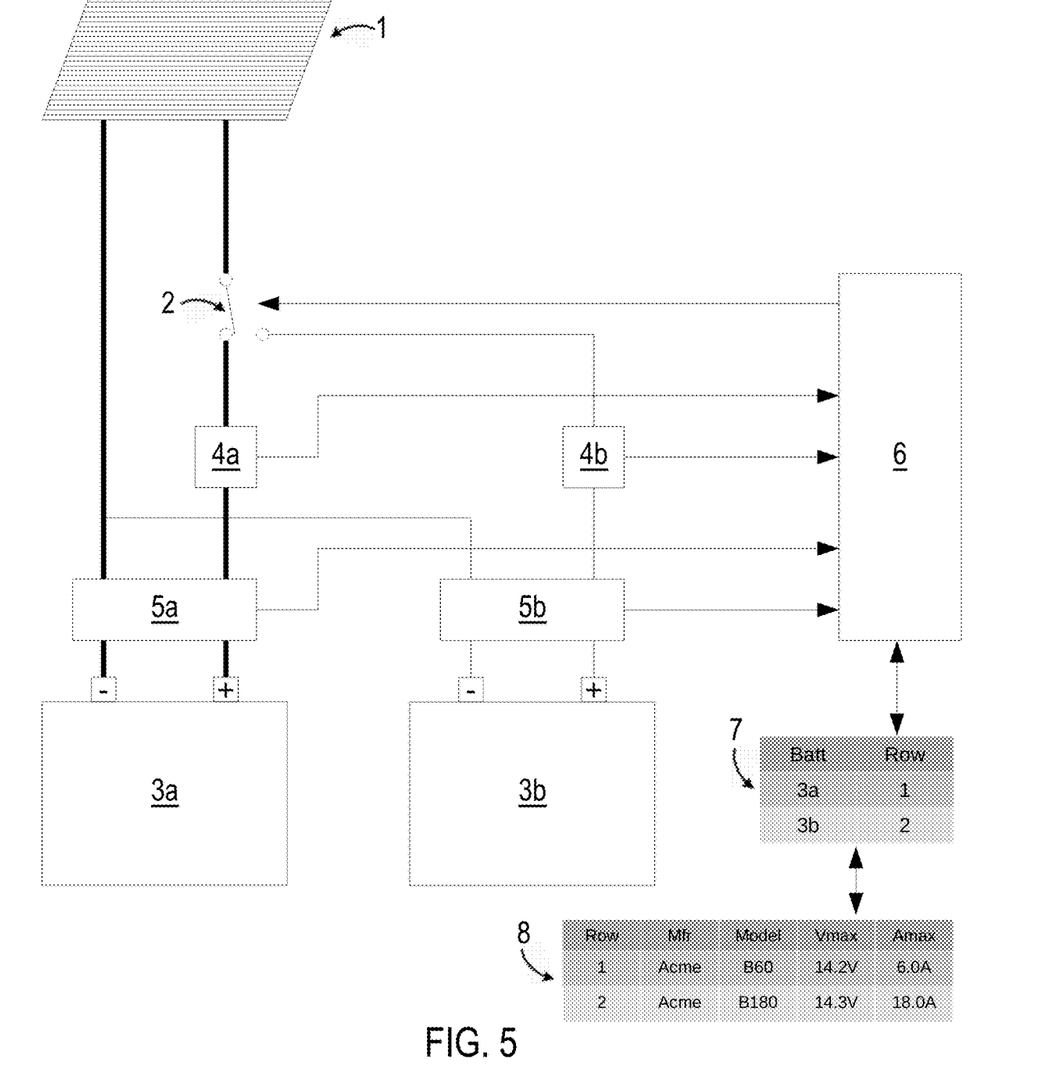

FIG. 5 shows another example multiple-battery charger including a control element 6 that includes a plurality of Tables. A first Table 7 indicates a type of battery that is connected to a particular connection of the multiple-battery charger. In particular, the first Table 7 acts as an index that references different rows of a second Table 8 that includes a wide range of well-known battery types, brands, and/or model numbers. Each row of the second Table 8 includes the charging parameters for a different type/brand/model of battery. In this way, the first Table 7 can inform the control element 6 which type of well-known battery is connected to each connection of the multiple-battery charger. For example, the first Table 7 and the second Table 8 may be initially programmed into the multiple-battery charger at the time of manufacture, and then subsequently the Tables may be updated via a firmware update of the control element 6.

Tables 7 and 8 are nonlimiting examples of information the controller may use to implement a desired charging logic/strategy. Virtually any information in any suitable data structure may be used by control element 6 to implement a desired charging logic/strategy. In other words, the control element 6 may be programmed with any desired charging logic/strategy, including logic/strategy that is dynamically adjusted based on various inputs.

Figure 6:
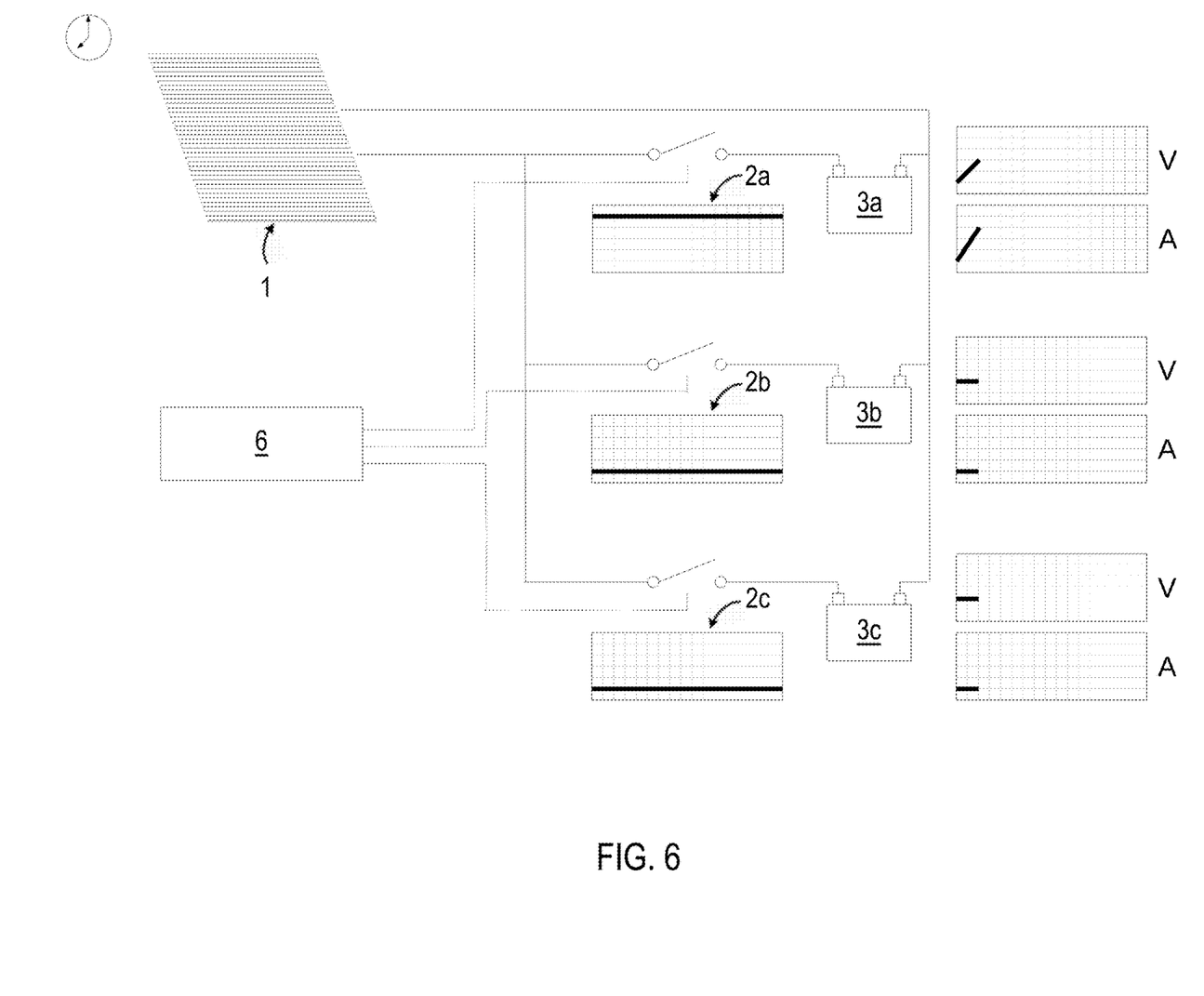
FIGS. 6-9 show an example cycle of operation of a multiple-battery charger over different periods throughout a day.

FIGS. 6-9 show an exemplary cycle of operation of a multiple-battery charger over a time period of one day. In this example scenario, the energy source that is connected to the multiple-battery charger is a solar panel 1. In FIG. 6, during a first period in an early time of day when the sun is relatively low in the sky, the control element is programmed to direct 100% of the power produced by the solar panel 1 to charge a first battery 3a that is one of three batteries connected to the multiple-battery charger in this example. The first battery 3a is in the bulk or constant-current phase of the first battery's charge cycle at this time, such that the first battery 3a accepts all of the power produced by the solar panel 1. The control element 6 sends a PWM signal with a duty cycle of 100% to a first switch 2a that is connected to the first battery 3a to ensure that all available power is used to charge the first battery 3a. Also, the control element 6 sends PWM signals to second and third switches 2b and 2c with duty cycles of 0%, such that the second and third switches 2b and 2c are maintained in an off or disconnected state. The voltage and current graphs for the first battery 3a indicate that both the voltage and current input of the first battery 3a increase as the sun rises higher in the sky during the first period in the early time of day and the solar panel 1 produces more power. The voltage and current graphs for the second and third batteries 2b and 2c indicate that the currant and voltage are unchanged during this first time period. Note that the horizontal time scale for the PWM waveforms is on the order of microseconds, which shows the instantaneous state of the switches. Also, note that the horizontal time scale for the voltage and current graphs is on the order of hours, which show how the battery state of charge is progressing over the course of one day.

Figure 7:
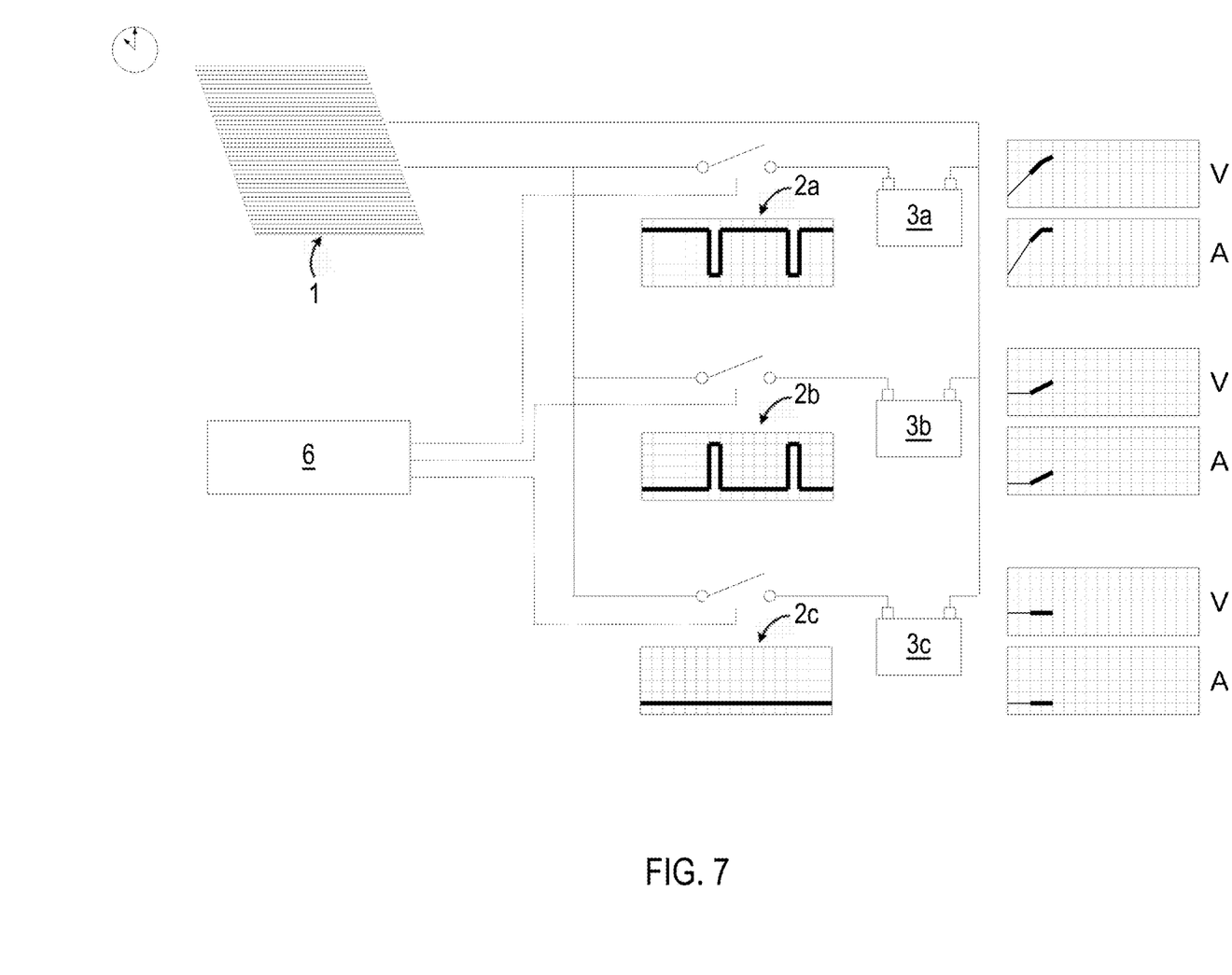

In FIG. 7, during a second period at a later time of day when the sun is higher in the sky, the solar panel 1 is approaching peak power production, and the first battery 3a has absorbed a large portion of the first battery's energy storage capacity. In this second time period, the amount of current that the solar panel 1 can produce now exceeds the maximum current that the first battery 3a can accept. In this condition, the control element 6 is programmed to send a PWM signal having a reduced duty cycle relative to the first time period to the first switch 2a to ensure that the current actually delivered to the first battery 3a does not exceed the first battery's current limit. Note that during the time intervals when the PWM signal to the first switch 2a is in the off or disconnected state, the PWM signal to the second switch 2b is in the on or connected state, enabling the remaining power output from the solar panel 1 to charge the second battery 3b. In this time period, the duty cycle of the PWM signal sent to the second switch 2b is increased relative to the first time period. This synchronous-phased timing of PWM pulses is used to programmatically distribute power across the multiple batteries. The voltage and current graphs for the first battery 3a indicate that the current of the first battery 3a has peaked to the first battery's current limit. Further, the voltage and current graphs for the second battery 3b indicate that the voltage and current are starting to climb as the second battery 3b accepts charge. The third battery 3c remains disconnected from the solar panel 1 during the second period.

Figure 8:
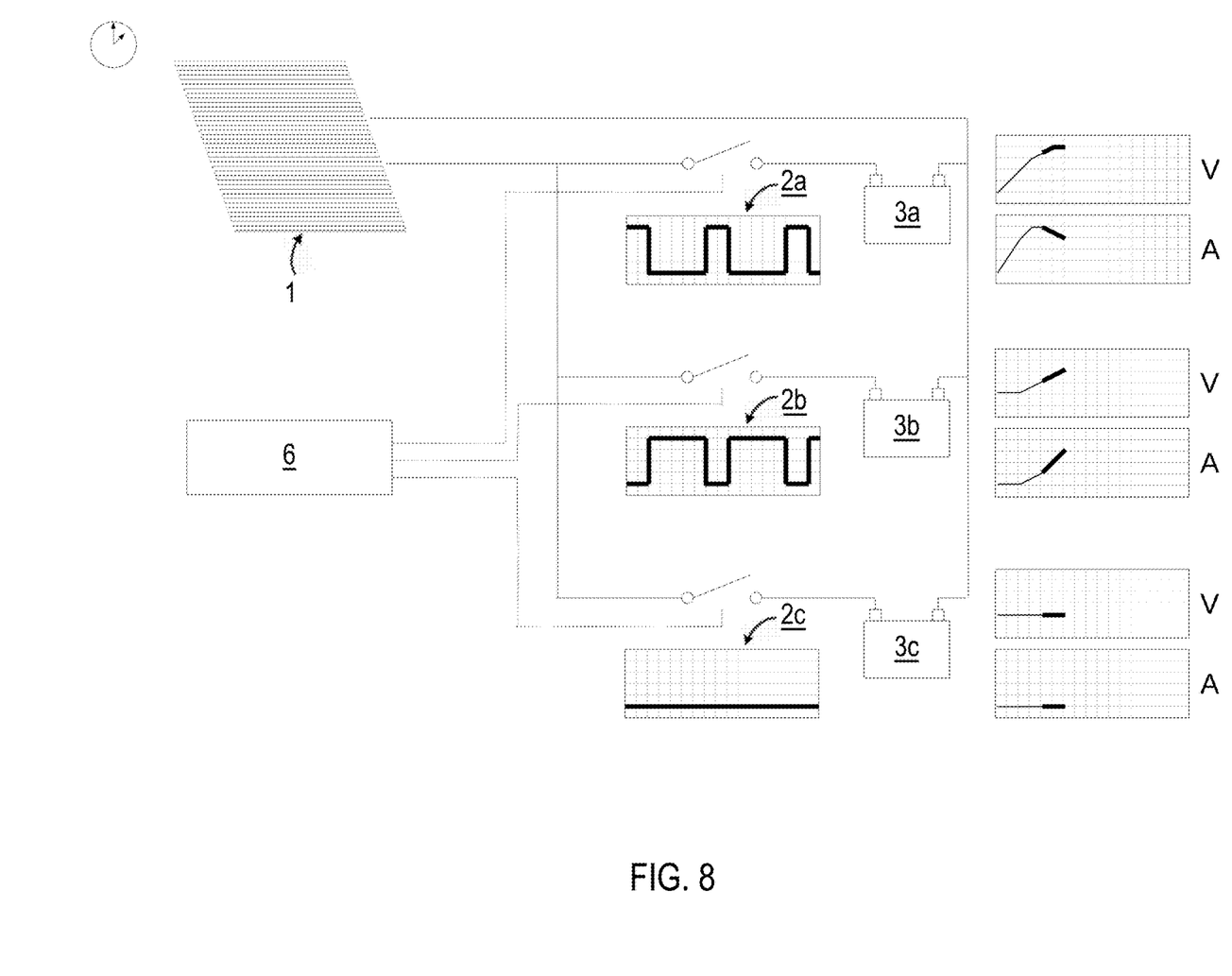

In FIG. 8, during a third period later in the same day with the sun still high in the sky, the first battery 3a has completed the bulk or constant-current phase of charging and has now entered the absorption or constant-voltage phase of charging. The control element 6 is programmed to deliver a relatively small duty-cycle PWM signal to the first switch 2a to ensure that the voltage on the first battery 3a does not exceed the voltage limit of the first battery 3a. In other words, in the third period, the duty cycle of the PWM signal sent to the first switch 2a is reduced relative to the second period. During this third period, a majority of power output from the solar panel 1 is now being delivered to the second battery 3b. In other words, in the third period, the duty cycle of the PWM signal sent to the second switch 2b is increased relative to the second period. The voltage and current graphs indicate that the first battery 3a is now at peak voltage, and the second battery 3b is now approaching peak current. The third battery 3c remains disconnected from the solar panel 1 during the third period.

Figure 9:
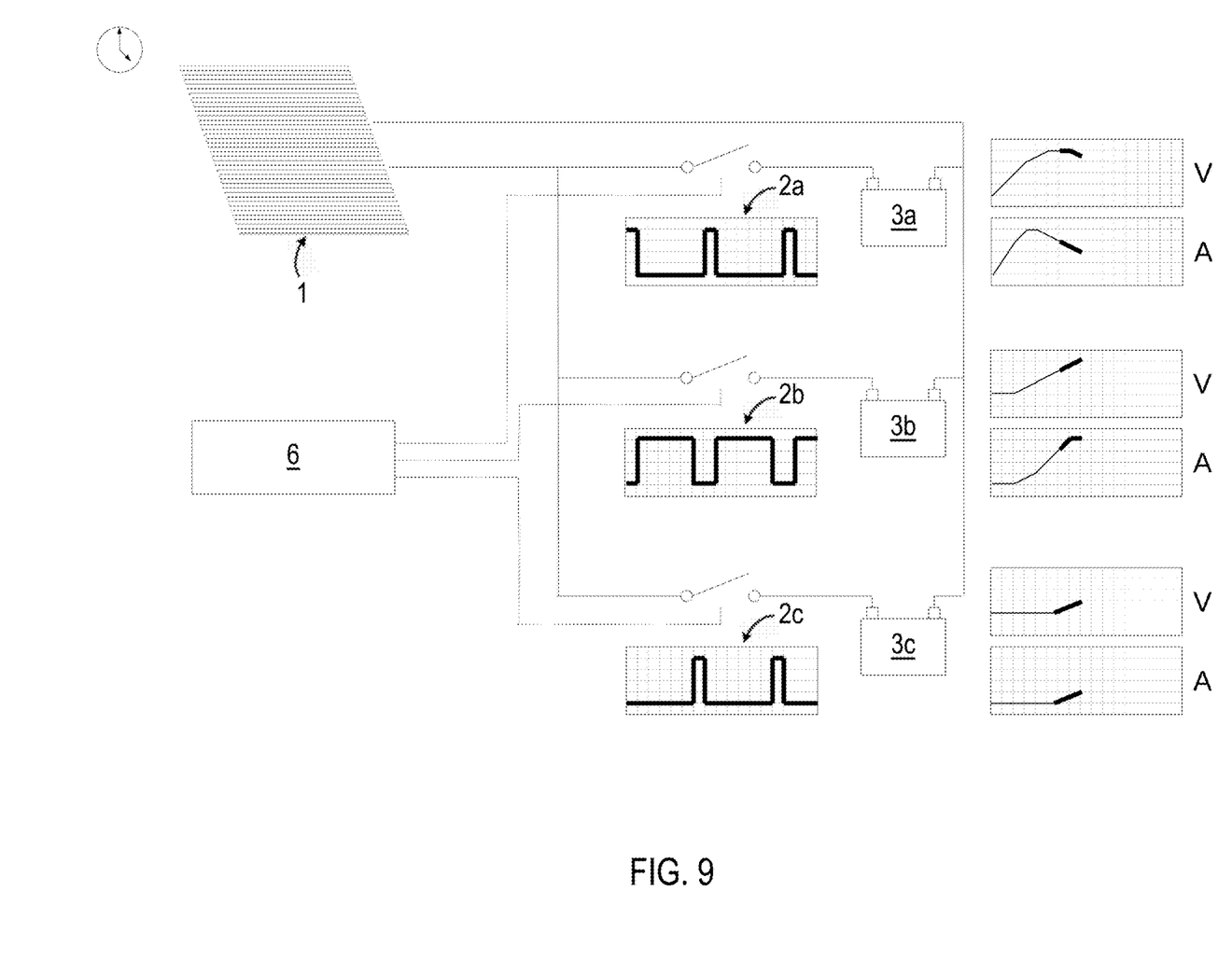

In FIG. 9, during a fourth period late in the day with the sun starting to lower in the sky, the first battery 3a is fully charged and is now receiving a maintenance charge (sometimes referred to as a float charge or a trickle charge). Such a maintenance charge accounts for a very small portion of the power output of the solar panel 1, as reflected in duty cycle of the PWM signal for the first switch 2a. The second battery 3b has now reached the current limit of the second battery 3b, and so the control element 6 is programmed to limit the power delivered to the second battery 3b. In other words, in the fourth period, the duty cycle of the PWM signal sent to the second switch 2b is reduced relative to the third period. This leaves a small surplus of power produced by the solar panel 1 that can now be delivered to the third battery 3c for charging. As such, the control element 6 is programmed to increase the duty cycle of the PWM signal sent to the third switch 2c.

The process of cascading available power to successive batteries can continue indefinitely. While FIGS. 6-9 show a battery charger configured to charge three batteries, there is no practical limit to the number of batteries whose charging phases can be overlapped using the herein disclosed technique. Further, the control element 6 can continuously adapt not only as each battery moves through the different charge phases of the battery, but also to changing external conditions, such as a passing cloud, that temporarily diminishes the available power produced by the solar panel 1. Note that during the time intervals when the PWM signals to the first switch 2a and the third switch 2c are in the off or disconnected state, the PWM signal to the second switch 2b is now in the on or connected state. This synchronous-phased timing of PWM pulses is used to programmatically distribute power across the multiple batteries.

The control element 6 may be configured to provide charge to the plurality of different batteries (e.g., 3a, 3b, 3c) according to any suitable battery charging logic/strategy by adjusting a duty cycle of the different switches of the multiple-battery charger.

The example multiple-battery chargers are illustrated in simplified form for clarity. It will be appreciated that the multiple-battery chargers and/or multiple-battery charging techniques disclosed herein can be modified with various optional components to further improve efficiency, such as by adding inductive and capacitive filters to smooth the switching effects of switches, as well as other similar measures that are practiced in battery charging and switch-mode power supply design. In some embodiments, the multiple-battery charger may include various refinements, such as boost-mode operation, temperature sensing and compensation, and/or maximum power point tracking.

Figure 10:
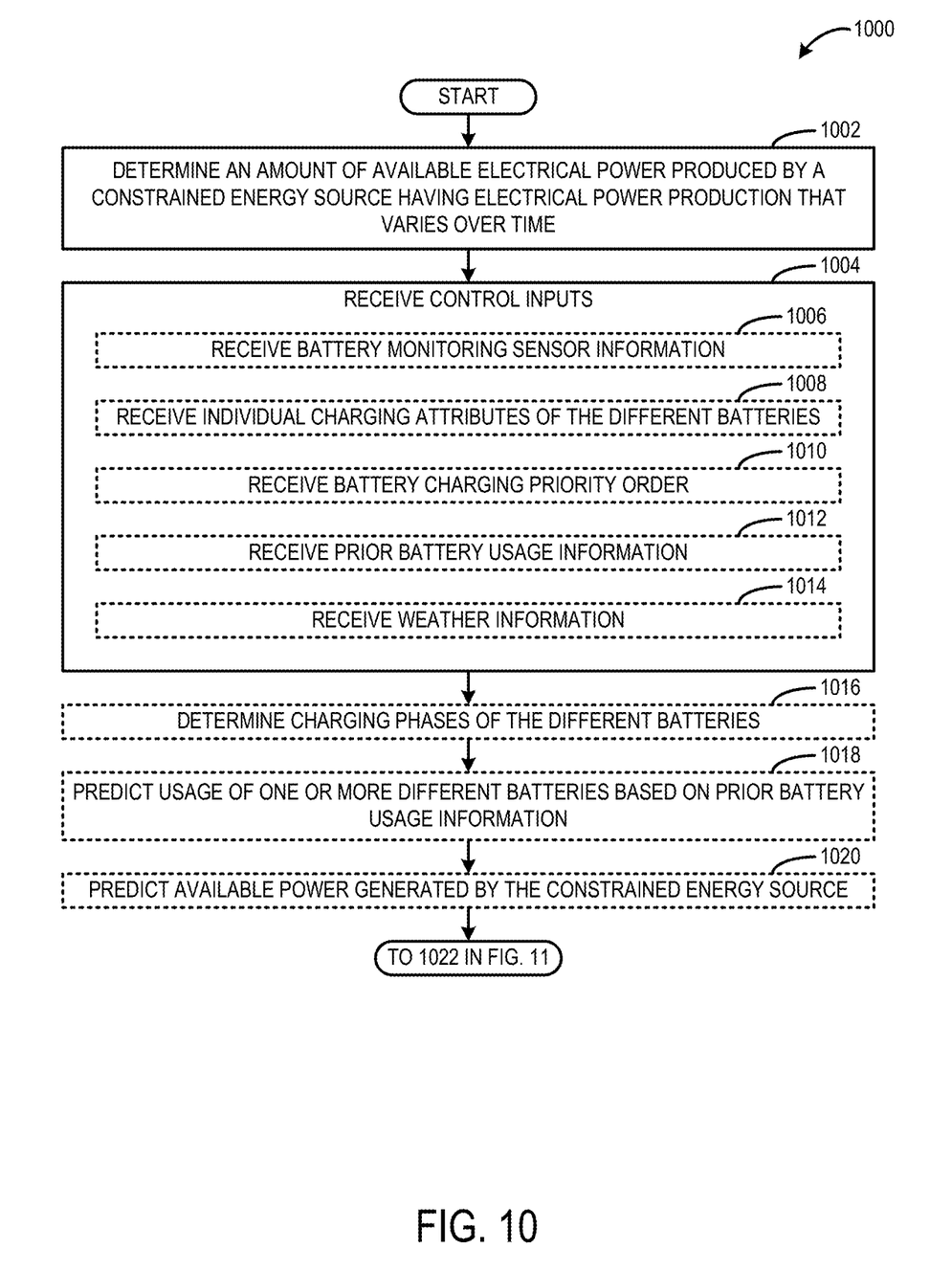
FIGS. 10 and 11 show a flowchart of an example method for efficiently charging multiple batteries with power received from a constrained energy source.
Figure 11:
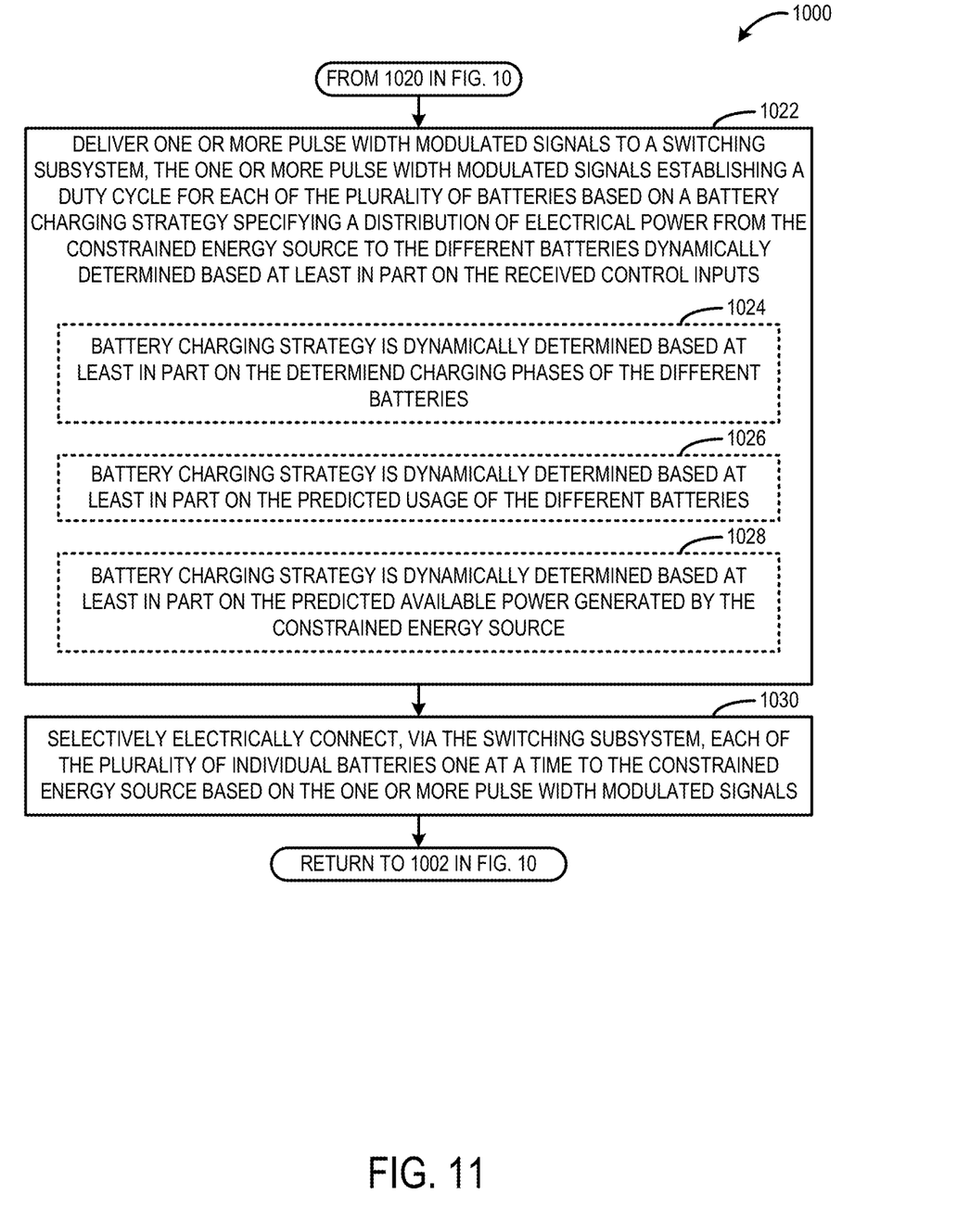

FIGS. 10 and 11 show an example method 1000 for efficiently charging multiple batteries at the same time with power received from a constrained energy source. For example, the method 1000 may be performed by the multiple-battery chargers shown in FIG. 1-9. Note that method steps indicated in dashed lines may be optional and, in some embodiments, may be omitted from the method 1000.

At 1002, the method 1000 includes determining an amount of available electrical power produced by a constrained energy source having electrical power production that varies over time. For example, such a constrained energy source may include one or more of solar panels, wind turbines, or another type of constrained energy source. At 1004, the method 1000 includes receiving control inputs that influence a battery charging strategy for specifying a distribution of the available power from the constrained energy source to the different batteries.

In some embodiments, at 1006, the method 1000 optionally may include receiving battery monitoring sensor information. For example, battery monitoring sensor information may include a voltage from a voltage sensor, a current from a current sensor, a load from a load monitor, and/or a temperature from a temperature sensor. In other examples, other battery operating parameter may be received from other types of battery monitoring sensors.

In some embodiments, at 1008, the method 1000 optionally may include receiving individual charging attributes of the different batteries. For example, such battery charging attributes may include voltage limits, current limits, and/or other charging attributes. Referring back to the example shown in FIG. 5, such charging attributes may be arranged in a table that is stored in memory of a control element of a multiple-battery charger. In another example, such charging attribute information may be received from a remoter computer, via a computer network.

In some embodiments, at 1010, the method 1000 optionally may include receiving a battery charging priority order. The battery charging priority order may dictate that a battery designated as having a higher priority receives a greater distribution of electrical power on a per duty cycle basis than a battery designated as having a lower priority. For example, in a vehicle application, an engine starting battery may have a higher charging priority than a battery used convenience functions.

In some embodiments, at 1012, the method 1000 optionally may include receiving prior battery usage information. Such prior battery usage information may include, for each of the plurality of batteries, tracked battery operating parameters (e.g., voltage, current, temperature, charge phase, load) over time. Such prior battery usage information may be used to make predictions about future usage of the plurality batteries that may influence a battery charging strategy that is employed to distribute electrical power from the constrained energy source to the different batteries.

In some embodiments, at 1014, the method 1000 may include receiving weather information. The weather information may include a forecast of upcoming weather in the area of the constrained energy source. For example, in the case of a solar panel, the weather forecast may indicate sunny or cloudy conditions that may dictate the amount of electrical power that the solar panel is able to generate during such weather conditions. As another example, in the case of a wind turbine, the weather forecast may indicate windy or calm weather conditions that may dictate the amount of electrical power that the wind turbine is able to generate during such weather conditions. Such weather information may influence a battery charging strategy that is employed to distribute electrical power from the constrained energy source to the different batteries.

In some embodiments, at 1016, the method 1000 optionally may include determining the charging phases of the different batteries that are being charged by the multiple-battery charger. Different non-limiting example charge phases may include bulk charge, absorption charge, very-low-energy pre-charge, and maintenance or trickle charge phases.

In some embodiments, at 1018, the method 1000 optionally may include predicting usage of one or more different batteries based on the prior battery usage information. Such predicted usage may influence a battery charging strategy that is employed to distribute electrical power from the constrained energy source to the different batteries.

In some embodiments, at 1020, the method 1000 optionally may include predicting available power generated by the constrained energy source. In some examples, such a prediction may be based on weather information.

Turning to FIG. 11, at 1022, the method 1000 includes delivering one or more pulse width modulated signals to a switching subsystem. The one or more pulse width modulated signals may establish a duty cycle with which each of the plurality of batteries is individually electrically connected one at a time to the constrained energy source to collectively receive the amount of available electrical power from the constrained energy source. The one or more pulse width modulated signals and correspondingly the duty cycles of the different batteries are dynamically determined according to a battery charging strategy that is based at least in part on the received control inputs.

In some embodiments, at 1024, the battery charging strategy optionally may be dynamically determined based at least in part on the determined charging phases of the different batteries. In one non-limiting example where two batteries are being charged, when a first battery is early in a charge cycle, the duty cycle of the first battery may be higher and the duty cycle of the second battery may be lower on a per duty cycle-basis. Thus, the first battery may receive a majority of the available electrical power and the second battery may receive a small portion of the energy source's surplus electrical power. However, as the charge cycle progresses, the first battery will approach a full charge capacity, and the vast majority of the electrical power will then be used to charge the second battery on a per duty cycle-basis. Once the current and voltage of the second battery, return to acceptable levels, the duty cycles of the different batteries may be adjusted to provide an equal percentage of power to each of the first and second batteries while protecting the first and second batteries from overcurrent and overvoltage conditions. In other examples, different battery charging strategies may be employed based on other suitable factors.

In some embodiments, at 1026, the battery charging strategy optionally may be dynamically determined based at least in part on the predicted usage of the batteries. For example, a battery that is predicted to be used before another battery may be prioritized to be charged ahead of the other battery.

In some embodiments, at 1028, the battery charging strategy optionally may be dynamically determined based at least in part on the predicted available power generated by the constrained energy source. For example, in the case of a solar panel, if the weather information forecasts currently sunny conditions and predicts clouds later in the day, the charging strategy may dictate that higher priority batteries are charged more aggressively now while the amount of available electrical power is more likely to be higher than later in the day.

At 1030, the method 1000 includes selectively electrically connecting, via the switching subsystem, each of the plurality of batteries one at a time to the constrained energy source based on the one or more pulse width modulated signals to distribute the electrical power from the constrained energy source to the different batteries. In some embodiments, switching may be performed repeatedly very rapidly (e.g., 100's-1000's time per second), such that electrical power may be appropriately distributed between the different batteries even as the amount of available electrical power from the constrained energy source varies over time.

In some embodiments, various method steps of the method 1000 may be performed repeatedly to account for changing operating conditions over time such that a relative proportion of electrical power delivered from the constrained energy source to the different batteries changes over time. For example, the control inputs may be repeatedly reexamined to check which inputs are available based on various factors (e.g., based on a battery being connected to the multiple-battery charger, based on gaining network connectivity to receive information from a remote source (e.g., battery information service computer, weather information service computer, location information service computer), based on being turned on, based on a designated time of day or a duration). Further, the battery charging strategy may be adjusted based on the currently available inputs.

The above-described method may be performed to distribute available electrical power from one or more energy sources independently to each battery and may allow different batteries with different functions, chemistries, and/or capacities to be charged at the same time in an optimal manner.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A multiple-battery charger, comprising:
a switching subsystem configured to selectively electrically connect each of a plurality of batteries one at a time to a constrained energy source having electrical power production that varies over time; and
a control element operatively connected to the switching subsystem and configured to deliver one or more pulse width modulated signals to the switching subsystem, the one or more pulse width modulated signals establishing a duty cycle in which the switching subsystem electrically connects each of the plurality of batteries to the constrained energy source one at a time to receive electrical power from the constrained energy source while synchronously disconnecting all others of the plurality of batteries from the constrained energy source.

2. The multiple-battery charger of claim 1, wherein the switching subsystem is configured to repeatedly rapidly switch the electrical connection between the constrained energy source and different batteries of the plurality of batteries according to the duty cycles established for the different batteries by the one or more pulse width modulated signals.

3. The multiple-battery charger of claim 2, wherein the control element includes control logic that defines a battery charging strategy specifying an unequal distribution of electrical power from the constrained energy source to the different batteries.

4. The multiple-battery charger of claim 2, wherein the control element includes control logic that defines a battery charging strategy specifying an equal distribution of electrical power from the constrained energy source to the different batteries.

5. The multiple-battery charger of claim 2, wherein the control element includes control logic that defines a battery charging strategy specifying a changing distribution of electrical power from the constrained energy source to the different batteries such that a relative proportion of electrical power delivered from the constrained energy source to the different batteries changes over time.

6. The multiple-battery charger of claim 5, wherein the battery charging strategy specifies that the changing distribution of electrical power changes responsive to a detected change in a charging phase of one or more of the different batteries.

7. The multiple-battery charger of claim 2, wherein the control element includes control logic that defines a battery charging strategy specifying a distribution of electrical power from the constrained energy source to the different batteries is based on a priority order of the different batteries such that a battery designated as having a higher priority receives a greater distribution of electrical power on a per duty cycle basis than a battery designated as having a lower priority.

8. The multiple-battery charger of claim 1, wherein the control element includes control logic that defines a battery charging strategy specifying a distribution of electrical power from the constrained energy source to different batteries of the plurality of batteries is dynamically determined based at least in part on weather information received by the control element.

9. The multiple-battery charger of claim 1, wherein the control element includes control logic that defines a battery charging strategy specifying a distribution of electrical power from the constrained energy source to different batteries of the plurality of batteries is dynamically determined based at least in part on a predicted usage of one or more of the different batteries.

10. The multiple-battery charger of claim 1, wherein the control element includes control logic that defines a battery charging strategy specifying a distribution of electrical power from the constrained energy source to different batteries of the plurality of batteries is dynamically determined based at least in part on predicted available power expected to be generated by the constrained energy source.

11. The multiple-battery charger of claim 1, wherein the control element includes control logic that is configured to track individual charging attributes of different batteries, and wherein the control logic defines a battery charging strategy specifying a distribution of electrical power from the constrained energy source to different batteries of the plurality of batteries is dynamically determined based at least in part on the individual charging attributes of the different batteries.

12. The multiple-battery charger of claim 1, wherein the constrained energy source includes a solar energy source.

13. The multiple-battery charger of claim 1, wherein the plurality of batteries includes different heterogenous batteries.

14. A method for charging a plurality of batteries, the method comprising:
   determining an amount of available electrical power produced by a constrained energy source having electrical power production that varies over time;
   delivering one or more pulse width modulated signals to a switching subsystem, the one or more pulse width modulated signals establishing a duty cycle in which each of a plurality of batteries is individually electrically connected one at a time to the constrained energy source to collectively receive the amount of available electrical power from the constrained energy source while synchronously disconnecting all others of the plurality of batteries from the constrained energy source; and
   selectively electrically connecting, via the switching subsystem, each of the plurality of batteries one at a time to the constrained energy source based on the one or more pulse width modulated signals while synchronously disconnecting all the others of the plurality of batteries from the constrained energy source.

15. The method of claim 14, wherein a distribution of electrical power from the constrained energy source to different batteries of the plurality of batteries is based on a priority order of the plurality of batteries such that a battery designated as having a higher priority receives a greater distribution of electrical power on a per duty cycle basis than a battery designated as having a lower priority.

16. The method of claim 14, wherein a distribution of electrical power from the constrained energy source to different batteries of the plurality of batteries is dynamically determined based at least in part on weather information.

17. The method of claim 14, wherein a distribution of electrical power from the constrained energy source to different batteries of the plurality of batteries is dynamically determined based at least in part on a predicted usage of one or more different batteries.

18. The method of claim 14, wherein a distribution of electrical power from the constrained energy source to different batteries of the plurality of batteries is dynamically determined based at least in part on predicted available power generated by the constrained energy source.

19. The method of claim 14, further comprising tracking individual charging attributes of different batteries of the plurality of batteries, and wherein a distribution of electrical power from the constrained energy source to the different batteries is dynamically determined based at least in part on the individual charging attributes of the different batteries.

20. A multiple-battery charger, comprising:
   a switching subsystem configured to selectively electrically connect each of a plurality of batteries one at a time to a constrained energy source having electrical power production that varies over time; and
   a control element operatively connected to the switching subsystem and configured to deliver one or more pulse width modulated signals to the switching subsystem, the one or more pulse width modulated signals establishing a duty cycle in which the switching subsystem electrically connects each of the plurality of batteries to the constrained energy source one at a time to receive electrical power from the constrained energy source while synchronously disconnecting all others of the plurality of batteries from the constrained energy source, and wherein the switching subsystem is configured to repeatedly rapidly switch the electrical connection between the constrained energy source and different batteries of the plurality of batteries one at time according to the duty cycles established for the different batteries by the one or more pulse width modulated signals.

21. A multiple-battery charger, comprising:
   a switching subsystem configured to selectively electrically connect each of a plurality of batteries one at a time to a constrained energy source having electrical power production that varies over time; and
   a control element operatively connected to the switching subsystem and configured to deliver one or more pulse width modulated signals to the switching subsystem, the one or more pulse width modulated signals establishing a duty cycle with which each of the plurality of batteries is electrically connected to the constrained energy source to receive electrical power from the constrained energy source, wherein the control element includes control logic that defines a battery charging strategy specifying a distribution of electrical power from the constrained energy source to different batteries of the plurality of batteries is dynamically determined based at least in part on a predicted usage of one or more of the different batteries.

22. A multiple-battery charger, comprising:
   a switching subsystem configured to selectively electrically connect each of a plurality of batteries one at a time to a constrained energy source having electrical power production that varies over time; and
   a control element operatively connected to the switching subsystem and configured to deliver one or more pulse width modulated signals to the switching subsystem, the one or more pulse width modulated signals establishing a duty cycle with which each of the plurality of batteries is electrically connected to the constrained energy source to receive electrical power from the constrained energy source, wherein the control element includes control logic that defines a battery charging strategy specifying a distribution of electrical power from the constrained energy source to different batteries of the plurality of batteries is dynamically determined based at least in part on predicted available power expected to be generated by the constrained energy source.

* * * * *